(12) United States Patent
Marathe et al.

(10) Patent No.: US 7,887,240 B2
(45) Date of Patent: Feb. 15, 2011

(54) THRUST WASHER WITH ENCLOSED CHANNELS

(75) Inventors: Bhaskar Marathe, Wooster, OH (US); Steven Olsen, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 1068 days.

(21) Appl. No.: 11/637,332

(22) Filed: Dec. 12, 2006

(65) Prior Publication Data

US 2007/0144161 A1    Jun. 28, 2007

Related U.S. Application Data

(60) Provisional application No. 60/753,226, filed on Dec. 22, 2005.

(51) Int. Cl.
*F16C 17/04* (2006.01)

(52) U.S. Cl. .................. 384/420; 384/303; 384/368

(58) Field of Classification Search .......... 384/121, 384/303, 305, 368, 420, 425, 590; 411/531, 411/534, 537, 545
See application file for complete search history.

(56) References Cited

U.S. PATENT DOCUMENTS

| | | | | |
|---|---|---|---|---|
| 1,786,565 A * | 12/1930 | Freeman | ...................... | 384/368 |
| 1,845,789 A * | 2/1932 | Gilson | ...................... | 384/368 |
| 2,737,423 A * | 3/1956 | Zeidler | ...................... | 384/420 |
| 5,175,999 A | 1/1993 | Hara et al. | | |
| 5,575,363 A | 11/1996 | Dehrmann et al. | | |
| 5,765,950 A * | 6/1998 | Eno et al. | ...................... | 384/425 |
| 6,502,994 B2 * | 1/2003 | Jackson | ...................... | 384/420 |
| 6,789,992 B2 * | 9/2004 | Horng et al. | ................. | 411/534 |
| 6,851,532 B2 * | 2/2005 | Back et al. | ..................... | 192/3.3 |
| 7,077,253 B2 * | 7/2006 | Maienschein | ............... | 192/212 |
| 7,252,615 B2 * | 8/2007 | Kempf | ......................... | 475/159 |
| 2004/0026201 A1 * | 2/2004 | Imasaka et al. | ............ | 192/3.23 |
| 2004/0172936 A1 | 9/2004 | Mueller et al. | | |
| 2006/0137952 A1 * | 6/2006 | Hinkel | ........................ | 192/3.21 |

FOREIGN PATENT DOCUMENTS

| | | | |
|---|---|---|---|
| JP | 7310816 | | 11/1995 |
| JP | 08 028652 | | 2/1996 |
| JP | 2001323985 A | * | 11/2001 |
| JP | 2003106397 | | 4/2003 |
| JP | 2004308854 | | 11/2004 |
| JP | 2004308855 | | 11/2004 |
| KR | 2003032235 A | * | 4/2003 |

* cited by examiner

*Primary Examiner*—Marcus Charles
(74) *Attorney, Agent, or Firm*—Simpson & Simpson, PLLC

(57) ABSTRACT

A thrust washer for a torque converter, including a front surface and at least one first channel. The at least one channel is at least partially enclosed by the front surface and is in fluid communication with an inner circumference and an outer circumference for the thrust washer. The front surface is arranged to engage a cover for the torque converter. In some aspects, the at least one channel is fully enclosed by the front surface. The thrust washer also includes a back surface, oppositely disposed from the front surface. The at least one channel is at least partially enclosed by the back surface. In some aspects, the thrust washer includes a front piece and a back piece matingly engaged and configured to form the at least one channel. The front and back pieces are fixedly secured or removably secured.

21 Claims, 8 Drawing Sheets

THRUST WASHER WITH ENCLOSED CHANNELS

CROSS-REFERENCE TO RELATED APPLICATIONS

This application claims the benefit under 35 U.S.C. §119(e) of U.S. Provisional Application No. 60/753,226, filed Dec. 22, 2005.

FIELD OF THE INVENTION

The invention relates to improvements in apparatus for fluid flow within a torque converter. In particular, the invention relates to a thrust washer facilitating fluid flow between a transmission shaft associated with a torque converter and components peripheral to the hub for the torque converter while minimizing discontinuities in the surface of the washer.

BACKGROUND OF THE INVENTION

FIG. 13 is a front view of prior art thrust washer 300. During operation of a torque converter (not shown), thrust is generated on a hub for the converter, causing the hub to contact a cover for the torque converter. To prevent excessive wear between the hub and cover a thrust washer, for example, thrust washer 300, is disposed between the hub and the cover. At the same time, fluid circuits must be provided in the torque converter for cooling fluids, such as oil. An adequate flow of fluid is necessary to change and maintain fluid pressures in the torque converter, necessary for adequate clutch capacity and clutch controllability. The thrust washer blocks some of the necessary fluid circuits, and so, provision must be made to allow fluid to pass between the inner and outer circumferences 302 and 304, respectively, of washer 300. To accomplish this flow, it is known to provide slots 306 in surface 308 of washer 300. Typically, surface 308 is the surface that will contact the cover noted supra.

Unfortunately, slots 306 create discontinuities in surface 308, which increase wear on the thrust washer. Increased wear results in a shorter life for the thrust washer, which can affect the effective life and/or maintenance required for the converter. Increased wear also can increase parts costs by requiring that the washer be made of more expensive, wear-resistant materials.

Thus, there is a long-felt need for a thrust washer that can provide adequate fluid through flow while maximizing the surface area of the washer.

BRIEF SUMMARY OF THE INVENTION

The present invention broadly comprises a thrust washer for a torque converter, including a front surface and at least one first channel. The at least one channel is at least partially enclosed by the front surface and is in fluid communication with an inner circumference and an outer circumference for the thrust washer. The front surface is arranged to engage a cover for the torque converter. In some aspects, the at least one channel is fully enclosed by the front surface. The thrust washer also includes a back surface, oppositely disposed from the front surface. The at least one channel is at least partially enclosed by the back surface. In some aspects, the at least one channel is fully enclosed by the back surface.

In some aspects, the thrust washer includes a front piece and a back piece. The front and back pieces are matingly engaged and the front and back pieces are configured to form the at least one channel. The front piece includes the front surface. In some aspects, the front and back pieces are fixedly secured or removably secured. In some aspects the front piece further comprises a first inside surface oppositely disposed from the front surface and configured to form at least a first portion of the at least one channel. In some aspects, the first inside surface further comprises a first plurality of raised segments.

In some aspects, the back piece further comprises a second inside surface oppositely disposed from the back surface and configured to form at least a second portion of the at least one channel. In some aspects, the second inside surface further comprises a second plurality of raised segments. In some aspects, the first and second inside surfaces form at least one protrusion and at least one recess.

In some aspects, the front surface includes at least one slot. In some aspects, the thrust washer is formed from a single piece of material.

The present invention also broadly comprises a thrust washer for a torque converter, including a front piece having a front surface, a back piece having a back surface, and at least one channel. The front surface is arranged to engage a cover for the torque converter. The at least one channel is in fluid communication with an inner circumference and an outer circumference for the thrust washer. The at least one channel is fully enclosed by the first and second surfaces. The front and back piece are matingly engaged and configured to form the at least one channel.

The present invention further broadly comprises a method for cooling a thrust washer in a torque converter.

It is a general object of the present invention to provide a thrust washer with improved cooling.

It is another object of the present invention to provide a thrust washer configured to increase fluid flow through a torque converter.

It is yet another object of the present invention to provide a thrust washer with decreased surface discontinuities.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
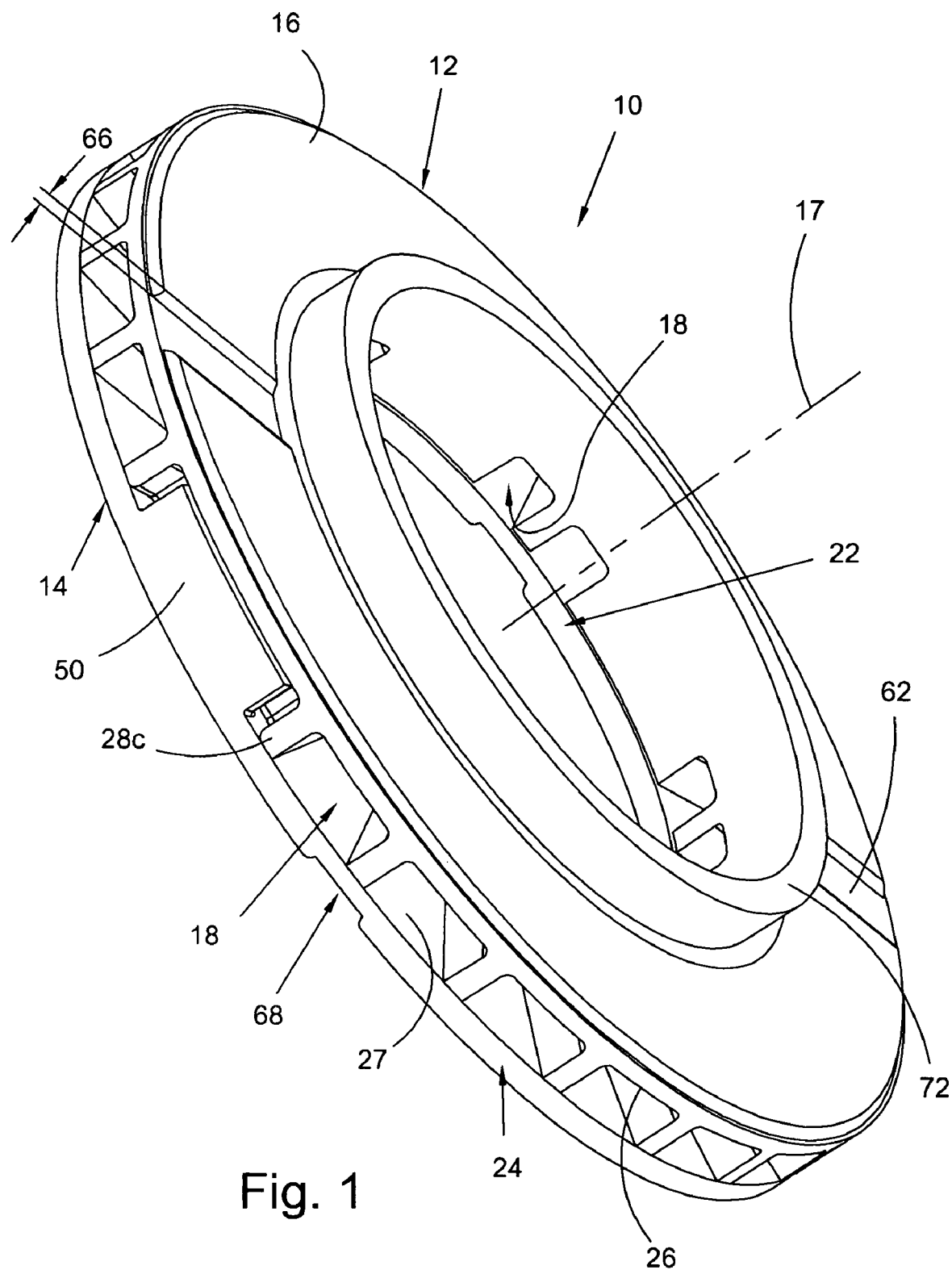
FIG. 1 is a perspective front view of a present invention thrust washer.

FIG. 1 is a perspective front view of present invention thrust washer 10.

Figures 2, 3:
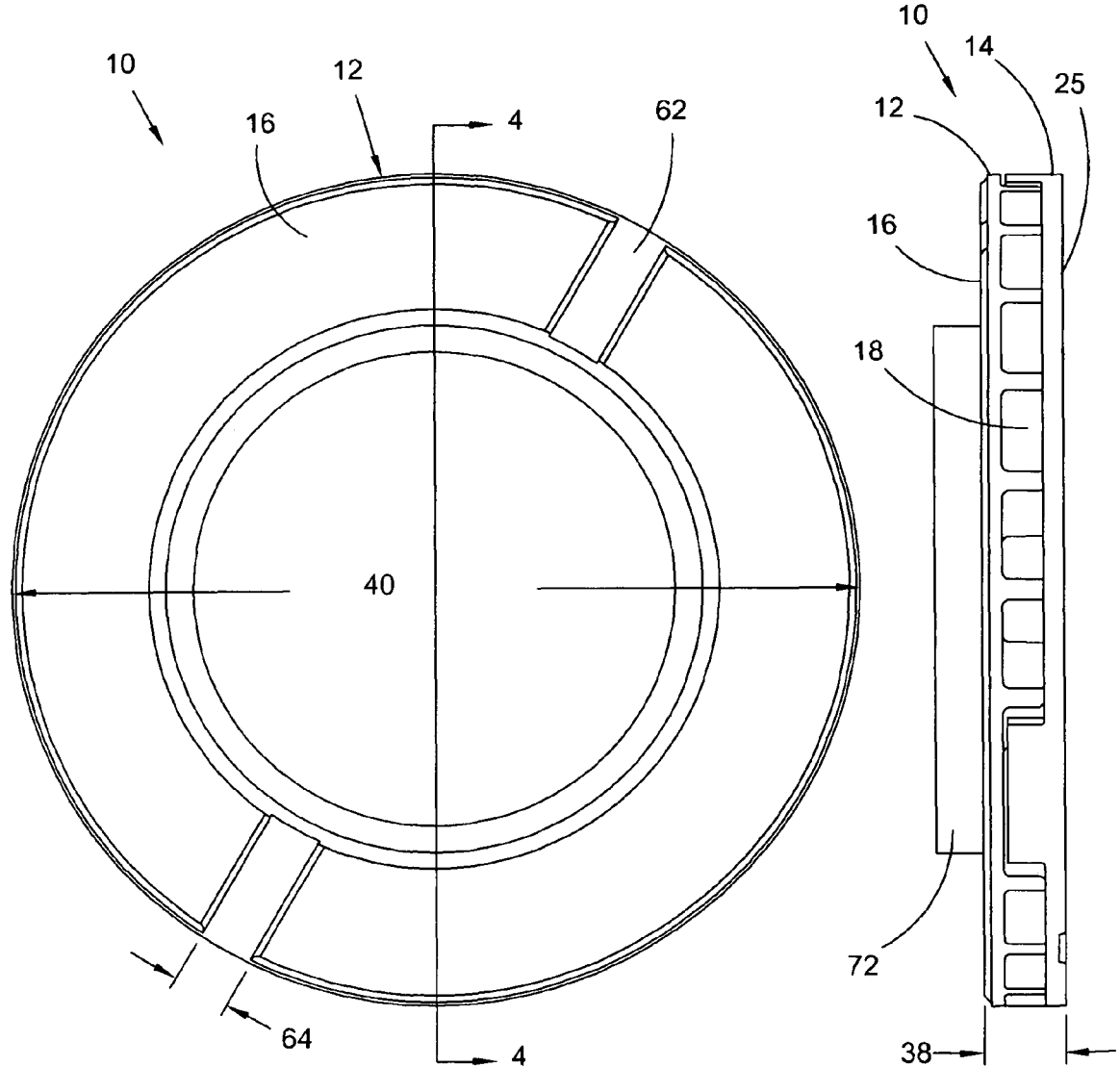
FIG. 2 is a front view of the thrust washer shown in FIG. 1.
FIG. 3 is a side view of the thrust washer shown in FIG. 1.

FIG. 2 is a front view of thrust washer 10 in FIG. 1.

FIG. 3 is a side view of thrust washer 10 in FIG. 1.

Figure 4:
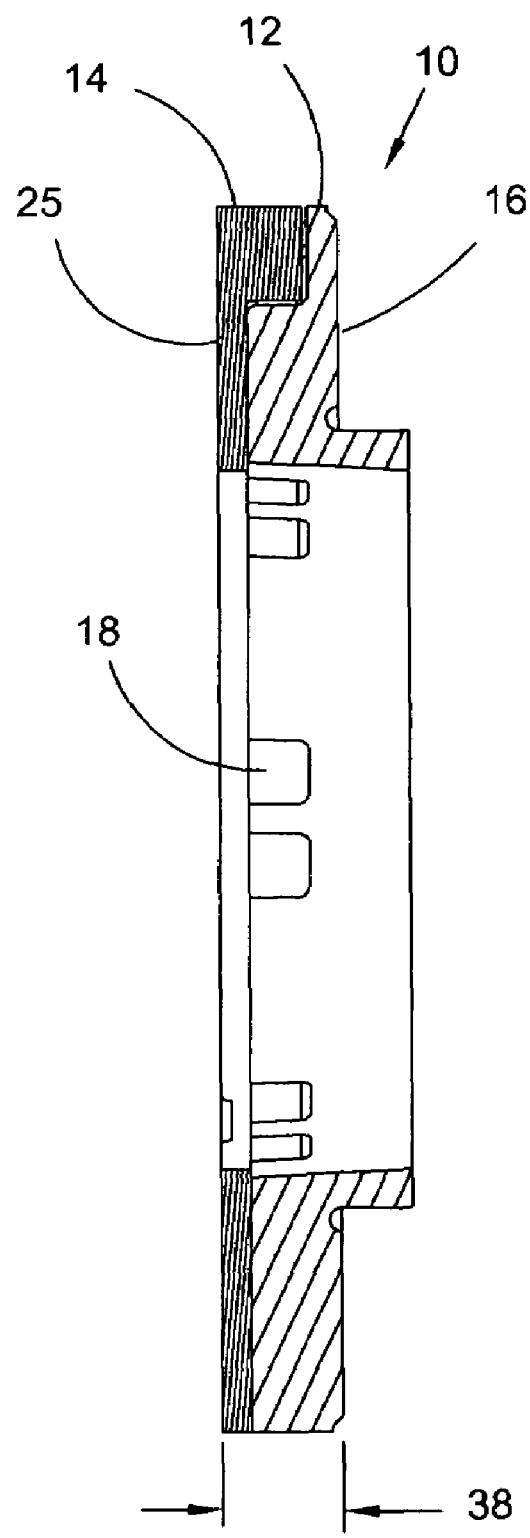
FIG. 4 is a cross-sectional view of the thrust washer shown in FIG. 2 along line 4-4.

FIG. 4 is a cross-sectional view of thrust washer 10 in FIG. 2 along line 4-4. The following should be viewed in light of FIGS. 1 through 4. In some aspects, the present invention includes split thrust washer 10 with front piece 12 and back piece 14. Piece 12 includes front surface 16. When installed in a torque converter (not shown) as shown infra, surface 16 is arranged so that the surface engages a cover for a torque converter. In general, surface 16 is orthogonal to longitudinal axis 17 of washer 10. When installed in the torque converter, axis 17 is parallel to a longitudinal axis (not shown) for the torque converter.

Washer 10 includes at least one channel 18. Channels 18 are at least partially enclosed by front surface 16. Alternately stated channels 18 are at least partially defined by front surface 16. By partially enclosed or defined, we mean that front surface 16 partially covers channels 18, channels 18 are partially closed with respect to surface 16, or portions of channels 18 are in fluid isolation from surface 16. In some aspects, channels 18 are fully enclosed with respect to surface 16. For example, in FIG. 2, a front view of piece 12, channels 18 are not visible since surface 16 is enclosing channels 18. Channels 18 are in fluid communication with inner circumference 22 and an outer circumference 24 of thrust washer 10. That is, fluids can flow in both radial directions between circumferences 22 and 24 through channels 18.

Back piece 14 includes back surface 25. In some aspects, back surface 25 encloses at least a portion of channels 18. In some aspects, channels 18 are fully enclosed by surface 25.

Figure 5:
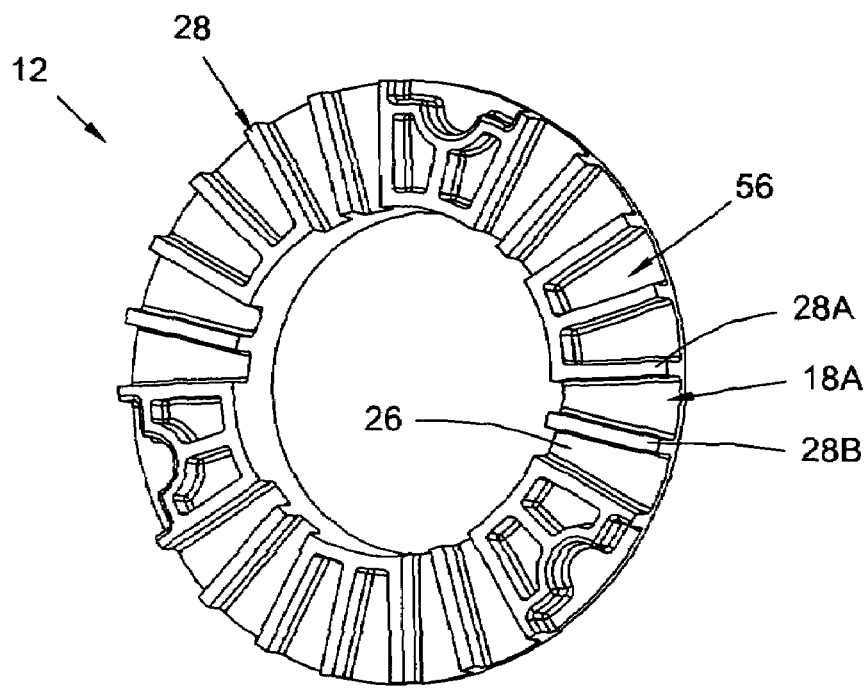
FIG. 5 is a prospective back view of the front piece shown in FIG. 1.

FIG. 5 is a prospective back view of piece 12 in FIG. 1.

Figures 6, 9:
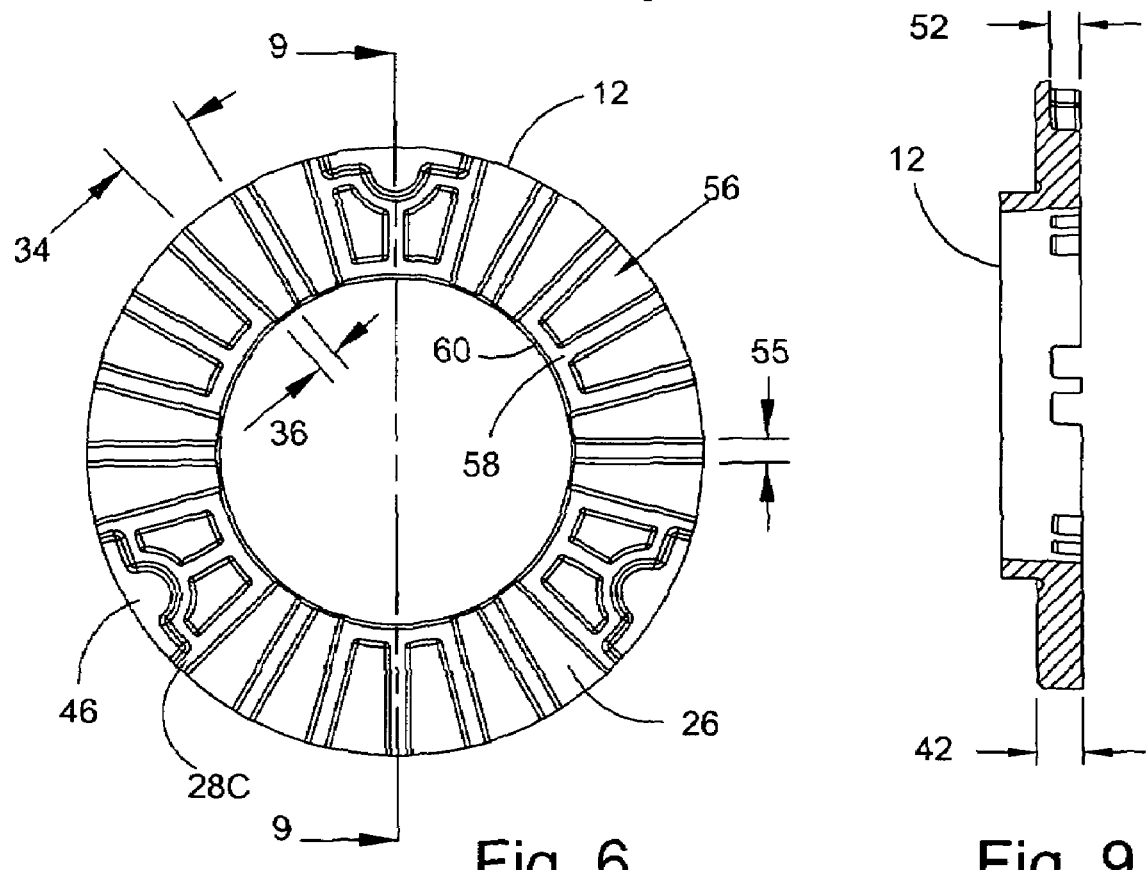
FIG. 6 is a back view of the front piece shown in FIG. 1.
FIG. 9 is a cross-sectional view of the front piece shown in FIG. 6 along line 9-9.

FIG. 6 is a back view of piece 12 in FIG. 1.

Figure 7:
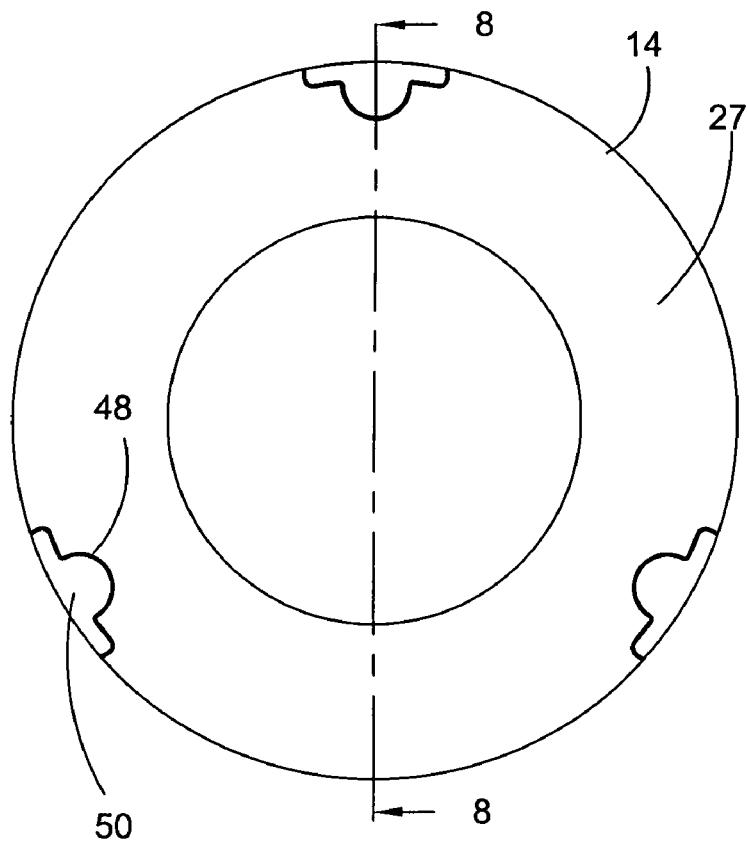
FIG. 7 is a front view of the back piece shown in FIG. 1.

FIG. 7 is a front view of back piece 14 in FIG. 1.

Figure 8:
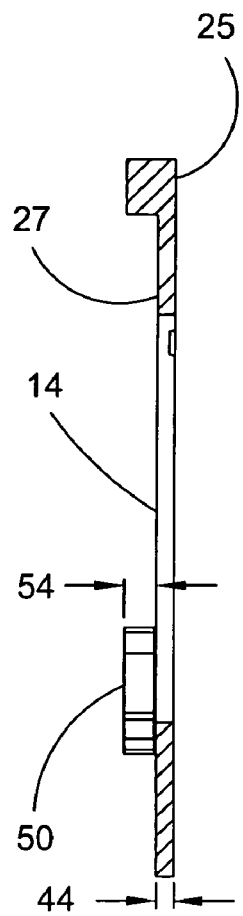
FIG. 8 is a cross-sectional view of the back piece shown in FIG. 7 along line 8-8.

FIG. 8 is a cross-sectional view of piece 14 in FIG. 7 along line 8-8.

FIG. 9 is a cross-sectional view of front piece 12 in FIG. 6 along line 9-9.

Figure 10:
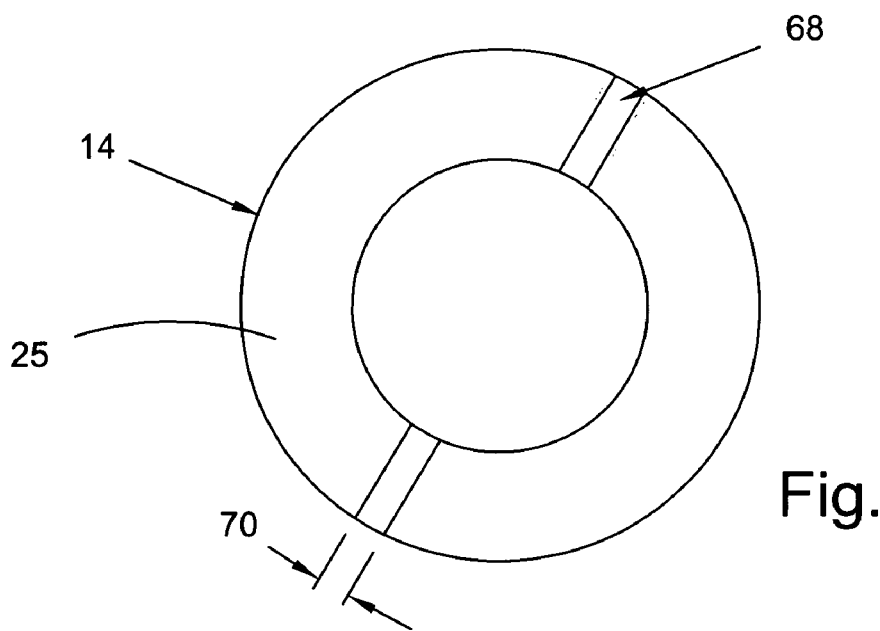
FIG. 10 is a back view of the back piece shown in FIG. 1.

FIG. 10 is a back view of back piece 14 shown in FIG. 1. The following should be viewed in light of FIGS. 1-10. In some aspects, pieces 12 and 14 are configured to form channels 18. Pieces 12 and 14 include inside surfaces 26 and 27, respectively. Inside surface 26 is oppositely disposed from surface 16. That is, surface 26 is on the opposite side of surface 16 with respect to axis 17. Inside surface 27 is oppositely disposed from surface 25. In some aspects, surfaces 26 and 27 are configured to form channels, for example, channels 18, in fluid communication with circumferences 22 and 24. In some aspects, surface 26 is configured to form a plurality of raised segments 28 that form at least a portion of channels 18. For example, segments 28A and 28B in FIG. 5 form the sides of channel 18A. The remainder of the channel is formed by surface 26 and 27. In some aspects (not shown), surface 27 is configured to form a plurality of raised segments that form at least a portion of channels in fluid communication with circumferences 22 and 24. It should be understood that channels in fluid communication with circumferences 22 and 24, for example, channels 18, are not limited to the shape, size, configuration, or number shown in the figures and that other shapes, sizes, configurations, and numbers are included in the spirit and scope of the invention as claimed. For example, channels 18 are not limited to a particular outside width 34, inside width 36, or ratio of inside and outside widths. It should be understood that both pieces 12 and 14 can be configured to form portions of the channels for a same washer 10.

Washer 10 is not limited to a particular thickness 38 or diameter 40. The thickness and diameter can be selected in accordance with specifications or requirements for the torque converter in which washer 10 is to be installed or in accordance with the physical characteristics of the material used to form the washer. Pieces 12 and 14 are not limited to particular thickness 42 and 44, respectively. Similar to washer 10, the thicknesses can be selected in accordance with specifications or requirements for the torque converter in which washer 10 is to be installed or in accordance with the physical characteristics of the material used to form the pieces.

In some aspects, pieces 12 and 14 are matingly engaged. That is, once engaged, for example, as shown in FIG. 1, the pieces are locked together, in particular, with respect to rotation about axis 17. In some aspects, the pieces are removably secured. That is, once attached, the pieces can be separated under normal conditions. Any means known in the art can be used to removably secure the pieces. In some aspects, pieces 12 and 14 are configured to form complimentary protrusions and recesses that are mated to affect the removable attachment. For example, segments 28C in piece 12 forms recesses 46 and segments 48 in piece 14 form protrusions 50. It should be understood that washer 10 is not limited to the respective shapes, sizes, configurations, or numbers shown in the figures for recesses 46 and protrusions 50 and that other respective shapes, sizes, configurations, or numbers for recesses 46 and protrusions 50 are within the spirit and scope of the invention as claimed. For example, recesses 46 are not limited to a particular depth 52 and protrusions 50 are not limited to a particular height 54. Also, segments 28 are not limited to any particular width 55. In some aspects (not shown), the pieces are fixedly secured. That is, once attached, the pieces are not designed to be separated under normal conditions. Any means known in the art can be used to fixedly secure the pieces, including, but not limited to welding, adhesives, or mechanical fasteners.

In some aspects, washer 10 includes channels having fluid communication with only one of circumferences 22 or 24. For example, channels 56 in piece 12 are "dead head" channels that are only in communication with outside circumference 24. In this aspect, raised segments 58 are formed along inner circumference 22. Segments 58 provide surface area along inside edge 60 of piece 12 to engage the pilot (not shown) associated with the installation of the washer in a torque converter (not shown). Segments 58 also provide extra support and strength to piece 12.

In some aspects, the number and size of channels in a present invention thrust washer, for example, channels 18, is determined to provide a specified cross-sectional area through which oil or cooling fluid can flow between the inner and outer circumferences of the washer. In general, this area is selected to be greater than the cross-sectional area of the transmission shaft channel(s) (not shown) for the vehicle in which the thrust washer is installed. These shafts provide a flow path for the oil in the torque converter.

In some aspects, surface 16 includes slots 62 with width 64 and depth 66. Slots 62 are configured to enable the lubrication of surface 16. In general, to maximize the area of surface 16, the number of slots 62 and the extent of width 64 are minimized. Maximizing the area of surface 16 decreases the discontinuities associated with surface 16 and hence decreases wear on surface 16. It should be understood that washer 10 is not limited to the shape, size, configuration, or number of slots 62 shown and that other shapes, sizes, configurations, and numbers of slots 62 are within the spirit and scope of the invention as claimed.

In some aspects, surface 25 includes slots 68. Slots 68 are configured to enable the lubrication of surface 25. In general, to maximize the area of surface 25, the number of slots 68 and the extent of width 70 are minimized. Maximizing the area of surface 25 decreases the discontinuities associated with surface 25 and hence decreases wear on surface 25. It should be understood that washer 10 is not limited to the shape, size, configuration, or number of slots 68 shown and that other shapes, sizes, configurations, and numbers of slots 68 are within the spirit and scope of the invention as claimed.

It should be understood that other means (not shown) can be used to form channels in and engage component halves of a present invention split thrust washer. For example, the halves could be formed in the shape of discs having respective inside surfaces in contact. Then, channels could be etched or otherwise formed in one or both of the inside surfaces. Regarding engagement, pins could be used to hold the halves together, or for the disc-like halves described supra protrusions could be formed extending from one or both inside surfaces and complimentary holes or indents could be formed in the opposing inside surface.

In some aspects (not shown), a present invention thrust washer is formed from a single piece of material and flow channels between the inner and outer circumference of the washer are formed in the single piece of material. For example, the channels can be drilled or bored. For a cast or molded thrust washer, the channels can be formed in the casting or molding. It should be understood that channels for a cast or molded washer also can be drilled or bored.

A present invention thrust washer can be formed of any material known in the art, including, but not limited to: plastic; ceramics; phenolic; die cast metals, particularly softer metals such as aluminum or copper; and powdered metals. It should be understood that a present invention washer can be formed of more than one material. For example, pieces 12 and 14 of washer 10 could be formed from different respective materials.

In some aspects, washer 10 includes collar 72, which is used to center the washer on the cover (not shown) for a torque converter in which the washer is installed. It should be understood that other means known in the art can be used to center a present invention thrust washer.

FIGS. 1 through 10 show an example of a present invention thrust washer. However, it should be understood that the present invention is not limited to the thrust washer shown in the figures and that the discussions in the descriptions of FIGS. 1 and 10 are applicable to other present invention washers.

Figure 11A:
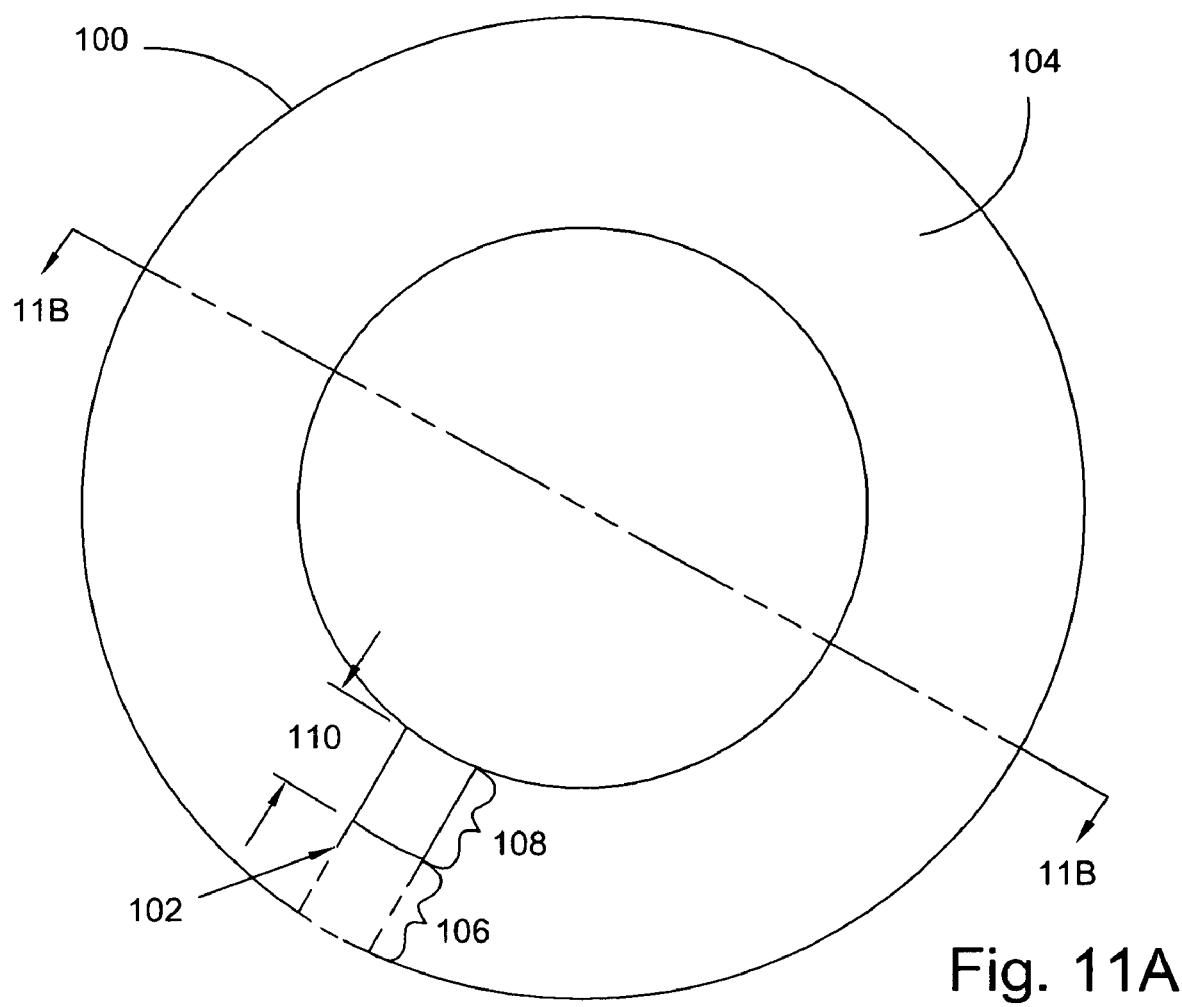
FIG. 11A is a front view of a present invention thrust washer with a channel partially enclosed by a front surface of the thrust washer.

FIG. 11A is a front view of present invention thrust washer 100 with channel 102 partially enclosed by front surface 104 of the thrust washer.

Figure 11B:
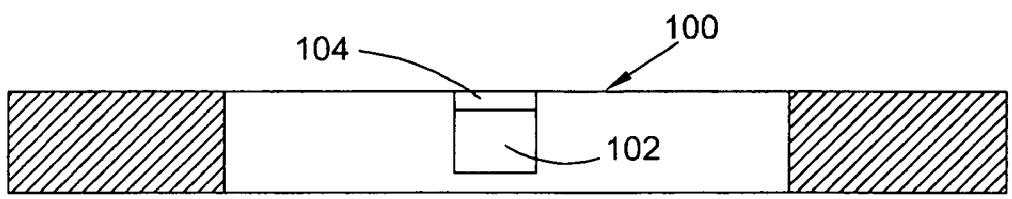
FIG. 11B is a cross-sectional view of the washer in FIG. 11A along line 11B-11B.

FIG. 11B is a cross-sectional view of washer 100 in FIG. 11A along line 11B-11B.

Figure 11C:
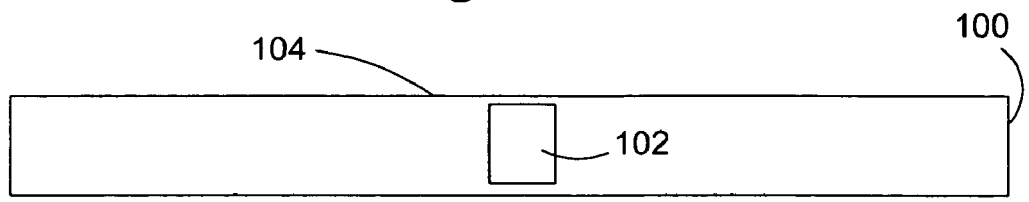
FIG. 11C is a side view of the washer in FIG. 11A showing the channel.

FIG. 11C is a side view of washer 100 in FIG. 11A showing channel 102. The following should be viewed in light of FIGS. 11A through 11C. Channels through a present invention thrust washer are at least partially enclosed by the front or back surfaces of the washer. For example, returning to FIG. 1, channels 18 are fully enclosed by surfaces 16 and 25. Alternately stated, channels 18 are not open to either of surfaces 16 and 25 and only open at circumferences 22 or 24. For washer 100, channel 102 is partially enclosed by surface 104. That is, portion 106 of the channel is covered by surface 104 and portion 108 is open to surface 104. That is, channel 102 forms a slot in portion 108. It should be understood that the present invention includes both fully and partially enclosed channels and such channels can be included in a same thrust washer. Further, the present invention is not limited to any particular combination of fully and partially enclosed channels or any particular ratio of covered and uncovered portions for a channel or channels. For example, length 110 for portion 108 can be proportionally longer or shorter than shown.

Figure 12:
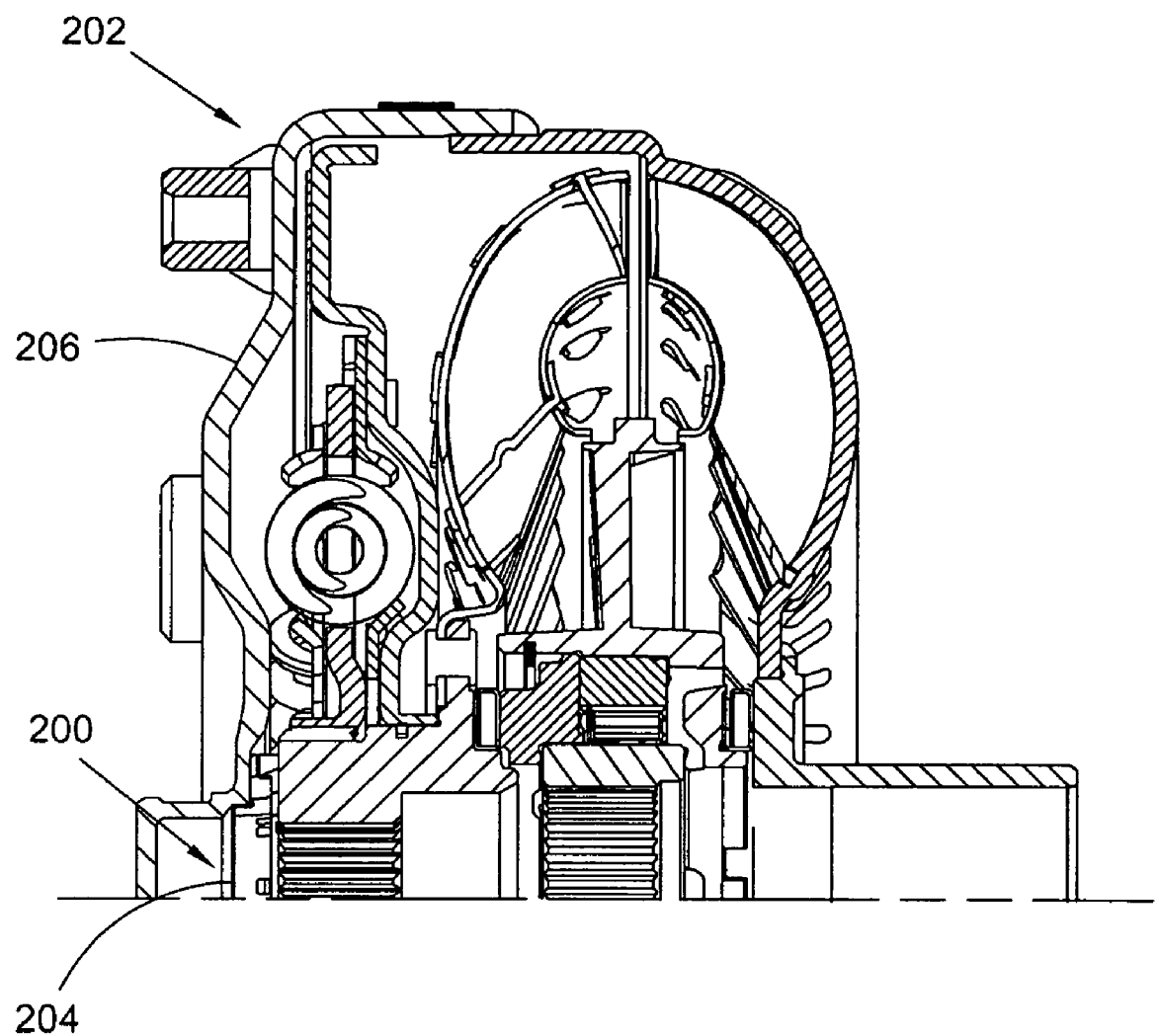
FIG. 12 is a partial cross-sectional view of a present invention thrust washer in a torque converter; and, FIG. 13 is a front view of a prior art thrust washer.
Figure 13:
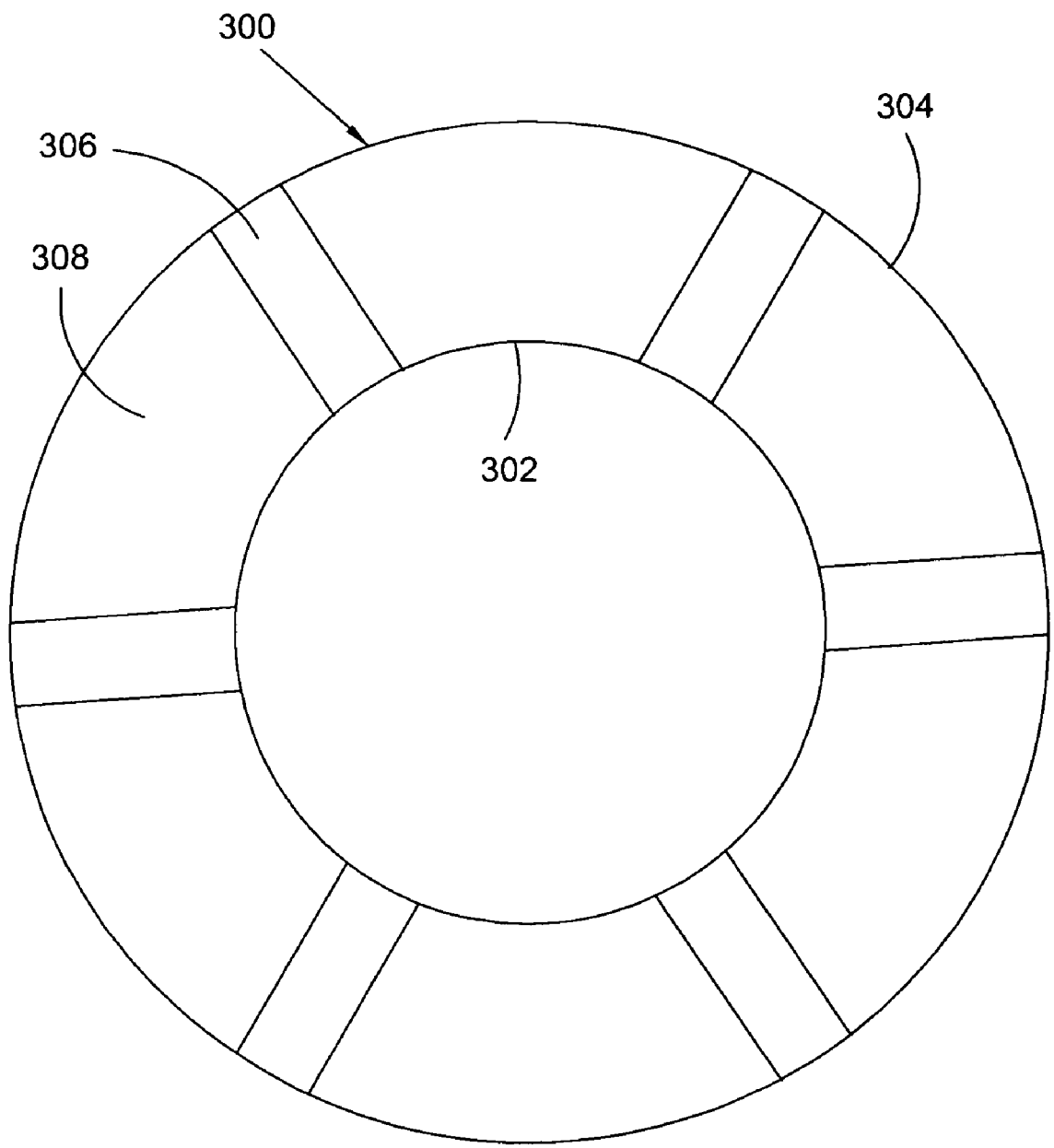

FIG. 12 is a partial cross-sectional view of present invention thrust washer 200 in torque converter 202. FIG. 12 shows present invention thrust washer 200 installed in a typical torque converter 202. It should be understood that the discussions in the descriptions of FIGS. 1 through 11C are applicable to washer 200. Front face 204 of washer 200 is shown engaging cover 206. It should be understood that a present invention washer is not limited to the torque converter shown in FIG. 12 and is at least applicable to any torque converter that stacks through a hub.

As noted supra, the movement of oil or cooling fluid in a torque converter is important to the operation of the converter. A present invention thrust washer increases flow of oil or other cooling fluid between the hub of a torque converter and portions of the torque converter peripheral to the hub. Such increased movement enables larger, quicker, and more efficient fluid pressure changes in the torque converter, which results in higher clutch capacity and better clutch controllability.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A thrust washer for a torque converter, comprising:
   a front piece including a first inside surface with at least one first protrusion and a first plurality of raised segments;
   a back piece including a second inside surface facing the first inside surface and including at least one second protrusion; and,
   at least one channel formed by the first and second inside surfaces and in fluid communication with an inner circumference and an outer circumference for said thrust washer.

2. The thrust washer of claim 1 wherein said front piece includes a front surface arranged to engage a cover for said torque converter.

3. The thrust washer of claim 1 wherein said at least one channel does not open into said front surface.

4. The thrust washer of claim 1 wherein the back piece includes a back surface, oppositely disposed from said front surface; and,
   wherein said at least one channel is at least partially enclosed by said back surface.

5. The thrust washer of claim 4 wherein said at least one channel does not open into said back surface.

6. The thrust washer of claim 1 wherein
   said front and back pieces are matingly engaged.

7. The thrust washer of claim 1 wherein said front and back pieces are fixedly secured to one another.

8. The thrust washer of claim 1 wherein said front and back pieces are removably secured to one another.

9. The thrust washer of claim 1 wherein said second inside surface further comprises a second plurality of raised segments.

10. The thrust washer of claim 1 wherein said front surface further comprises at least one slot.

11. The thrust washer of claim 1 wherein said thrust washer is formed from a single piece of material.

12. A method for cooling a thrust washer in a torque converter, comprising:
    configuring a first inside surface for a front piece for a thrust washer to form a first plurality of raised segments;
    placing the front piece and a back piece for the thrust washer in mating engagement;
    forming at least one channel in the front and back pieces of the thrust washer;
    at least partially enclosing said at least one first channel with a front surface for said front piece; and,
    connecting an inner circumference and an outer circumference for said thrust washer through said at least one channel, wherein said front piece further comprises a first inside surface oppositely disposed from said front surface; and, said method further comprising: configuring said first inside surface to form at least a first portion of said at least one channel.

13. The method of claim 12 further comprising:
    fully enclosing said at least one channel with said front surface.

14. The method of claim 12 wherein said thrust washer further comprises a back surface, oppositely disposed from said front surface; and,
    said method further comprising:
       at least partially enclosing said at least one channel with said back surface.

15. The method of claim 14 wherein said back piece further comprises a second inside surface oppositely disposed from said back surface; and,
    said method further comprising:
       configuring said second inside surface to form at least a second portion of said at least one channel.

16. The method of claim 15 further comprising: configuring said second inside surface to form a second plurality of raised segments.

17. The method of claim 15 further comprising: configuring said first and second inside surfaces to form at least one protrusion and at least one recess.

18. The method of claim 12 further comprising: fixedly attaching said front and back pieces to each other.

19. The method of claim 12 further comprising: removably attaching said front and back pieces to each other.

20. The method of claim 12 further comprising:
    forming at least one slot in said front surface.

21. The method of claim 12 further comprising:
    forming said thrust washer from a single piece of material.

* * * * *